United States Patent
Hyrenbach et al.

(10) Patent No.: US 9,196,431 B2
(45) Date of Patent: *Nov. 24, 2015

(54) ENCAPSULATED SWITCHGEAR

(71) Applicants: Maik Hyrenbach, Ratingen (DE); Ole Granhaug, Skien (NO); Max-Steffen Claessens, Untersiggenthal (CH); Per Skarby, Wurenlos (CH)

(72) Inventors: Maik Hyrenbach, Ratingen (DE); Ole Granhaug, Skien (NO); Max-Steffen Claessens, Untersiggenthal (CH); Per Skarby, Wurenlos (CH)

(73) Assignee: ABB Technology AG (CH)

( * ) Notice: Subject to any disclaimer, the term of this patent is extended or adjusted under 35 U.S.C. 154(b) by 1 day.

This patent is subject to a terminal disclaimer.

(21) Appl. No.: 14/175,430

(22) Filed: Feb. 7, 2014

(65) Prior Publication Data

US 2014/0151202 A1 Jun. 5, 2014

Related U.S. Application Data

(63) Continuation of application No. 13/323,519, filed on Dec. 12, 2011, now Pat. No. 8,680,421, which is a continuation of application No. PCT/EP2009/062640, filed on Sep. 29, 2009, and a continuation of application No. PCT/EP2009/057294, filed on Jun. 12, 2009.

(51) Int. Cl.
| | |
|---|---|
| *H01H 33/60* | (2006.01) |
| *H01H 9/02* | (2006.01) |
| *H01B 3/56* | (2006.01) |
| *H02B 13/055* | (2006.01) |
| *H01H 11/00* | (2006.01) |

(52) U.S. Cl.
CPC . *H01H 9/02* (2013.01); *H01B 3/56* (2013.01); *H01H 11/00* (2013.01); *H02B 13/055* (2013.01)

(58) Field of Classification Search
CPC . H01H 2033/566; H01H 33/22; H01H 33/64; H01H 2033/912; H01H 33/60; H01H 33/91; H01H 33/95
See application file for complete search history.

(56) References Cited

U.S. PATENT DOCUMENTS

| | | | | |
|---|---|---|---|---|
| 2,875,263 | A | * | 2/1959 | Narbutovskih ............. 174/15.1 |
| 3,150,245 | A | | 9/1964 | Leeds et al. |
| 3,185,734 | A | | 5/1965 | Fawcett et al. |
| 3,201,728 | A | | 8/1965 | McWhirter |
| 4,071,461 | A | | 1/1978 | Mears et al. |
| 4,136,121 | A | | 1/1979 | Martini et al. |

(Continued)

FOREIGN PATENT DOCUMENTS

| | | |
|---|---|---|
| CA | 2420574 C | 3/2002 |
| CA | 2516996 C | 9/2004 |

(Continued)

OTHER PUBLICATIONS

3M(tm) Novec(tm) 1230 Fire Protection Fluid—Brochure © 3M 2008; 6 pages.

(Continued)

*Primary Examiner* — Truc Nguyen
(74) *Attorney, Agent, or Firm* — St. Onge Steward Johnston & Reens LLC

(57) ABSTRACT

An encapsulated switchgear that includes a housing defining, an insulating space, and an electrical active part arranged in the insulating space, the insulating space with an insulation medium. The switchgear is characterized in that the insulation medium with a dielectric compound having a boiling point of above −5° C.

16 Claims, 1 Drawing Sheet

(56) References Cited

U.S. PATENT DOCUMENTS

| | | | |
|---|---|---|---|
| 4,162,227 A | 7/1979 | Cooke | |
| 4,166,798 A | 9/1979 | Mastroianni et al. | |
| 4,175,048 A | 11/1979 | Christophorou et al. | |
| 4,288,651 A | 9/1981 | Wootton | |
| 4,296,003 A | 10/1981 | Harrold et al. | |
| 4,350,838 A | 9/1982 | Harrold | |
| 4,440,971 A | 4/1984 | Harrold | |
| 5,247,101 A | 9/1993 | Takago et al. | |
| 5,399,718 A | 3/1995 | Costello et al. | |
| 5,466,877 A | 11/1995 | Moore | |
| 5,730,894 A | 3/1998 | Minor | |
| 5,858,065 A | 1/1999 | Li et al. | |
| 5,998,671 A | 12/1999 | Van Der Puy | |
| 6,276,190 B1 | 8/2001 | Zamfes | |
| 6,394,107 B1 | 5/2002 | Kesari et al. | |
| 6,403,149 B1 | 6/2002 | Parent et al. | |
| 6,478,979 B1 | 11/2002 | Rivers et al. | |
| 7,074,343 B2 | 7/2006 | Minor et al. | |
| 7,128,133 B2 | 10/2006 | Costello et al. | |
| 7,184,895 B2 | 2/2007 | Chetay et al. | |
| 7,314,576 B2 | 1/2008 | Minor et al. | |
| 7,390,427 B2 | 6/2008 | Costello et al. | |
| 7,416,679 B2 | 8/2008 | Minor et al. | |
| 7,736,529 B2 | 6/2010 | Luly et al. | |
| 7,742,283 B2 | 6/2010 | Hama et al. | |
| 7,816,618 B2 | 10/2010 | Uchii | |
| 7,923,630 B2 | 4/2011 | Richardson | |
| 8,080,185 B2 | 12/2011 | Luly et al. | |
| 8,245,512 B2 | 8/2012 | Schwiegel et al. | |
| 8,822,870 B2 * | 9/2014 | Mantilla et al. | 218/157 |
| 8,916,059 B2 * | 12/2014 | Glasmacher | 252/67 |
| 2002/0095262 A1 | 7/2002 | Chetay et al. | |
| 2003/0007543 A1 | 1/2003 | Grenfell et al. | |
| 2004/0056234 A1 | 3/2004 | Belt et al. | |
| 2004/0197474 A1 | 10/2004 | Vrtis et al. | |
| 2005/0127322 A1 | 6/2005 | Costello et al. | |
| 2006/0210711 A1 | 9/2006 | Hayashi et al. | |
| 2007/0221626 A1 | 9/2007 | Uchii | |
| 2008/0135817 A1 | 6/2008 | Luly et al. | |
| 2009/0078680 A1 | 3/2009 | Franck et al. | |
| 2009/0095717 A1 | 4/2009 | Luly et al. | |
| 2009/0109604 A1 | 4/2009 | Yanabu et al. | |
| 2011/0192821 A1 | 8/2011 | Dufournet | |
| 2011/0232870 A1 | 9/2011 | Flynn et al. | |
| 2012/0085735 A1 | 4/2012 | Uchii et al. | |
| 2012/0145521 A1 | 6/2012 | Glasmacher | |
| 2012/0152904 A1 | 6/2012 | Hyrenbach et al. | |

FOREIGN PATENT DOCUMENTS

| | | |
|---|---|---|
| CN | 101197221 A | 6/2008 |
| DE | 548450 C | 6/1934 |
| DE | 641963 C | 2/1937 |
| DE | 3215234 A1 | 10/1983 |
| DE | 19519301 A1 | 11/1996 |
| DE | 202009009305 U1 | 11/2009 |
| DE | 102009025204 C5 | 1/2013 |
| EP | 0131922 A1 | 1/1985 |
| EP | 0545430 A1 | 6/1993 |
| EP | 0670294 B1 | 9/1995 |
| EP | 1085365 A2 | 3/2001 |
| EP | 1132746 A2 | 9/2001 |
| EP | 1146522 A1 | 10/2001 |
| EP | 1221612 A1 | 7/2002 |
| EP | 1261398 B1 | 12/2002 |
| EP | 1498941 A2 | 1/2005 |
| EP | 1764487 A1 | 3/2007 |
| EP | 1933432 A1 | 6/2008 |
| EP | 2525454 A2 | 11/2012 |
| FR | 2930019 A1 | 10/2009 |
| FR | 2955970 A1 | 8/2011 |
| GB | 753375 A | 7/1956 |
| GB | 1194431 A | 6/1970 |
| JP | 8306549 A | 11/1996 |
| JP | 2738997 B2 | 4/1998 |
| JP | 2879848 B1 | 4/1999 |
| JP | 11286679 A | 10/1999 |
| JP | 2000059935 A | 2/2000 |
| JP | 2000224722 A | 8/2000 |
| JP | 2001086611 A | 3/2001 |
| JP | 2005126480 A | 5/2005 |
| JP | 2007300716 A | 11/2007 |
| JP | 2010021263 A | 1/2010 |
| JP | 2010021283 A | 1/2010 |
| JP | 2010131584 A | 6/2010 |
| JP | 2010171173 A | 8/2010 |
| KR | 20070080895 A | 8/2007 |
| RU | 2276164 C2 | 5/2006 |
| WO | 0024814 A1 | 5/2000 |
| WO | 0105468 A2 | 1/2001 |
| WO | 0250173 A2 | 6/2002 |
| WO | 02086191 A1 | 10/2002 |
| WO | 02086192 A1 | 10/2002 |
| WO | 02103319 A1 | 12/2002 |
| WO | 03022981 A1 | 3/2003 |
| WO | 2004090177 A1 | 10/2004 |
| WO | 2007013169 A1 | 2/2007 |
| WO | 2007075804 A1 | 7/2007 |
| WO | 2007136948 A2 | 11/2007 |
| WO | 2008073790 A2 | 6/2008 |
| WO | 2010108934 A1 | 9/2010 |
| WO | 2010142346 A1 | 12/2010 |
| WO | 2010146022 A1 | 12/2010 |
| WO | 2011019456 A1 | 2/2011 |
| WO | 2011054870 A1 | 5/2011 |
| WO | 2011090992 A1 | 7/2011 |
| WO | 2011119421 A1 | 9/2011 |
| WO | 2011119456 A1 | 9/2011 |
| WO | 2012038442 A1 | 3/2012 |
| WO | 2012038443 A1 | 3/2012 |

OTHER PUBLICATIONS

3M(tm) Flüssigkeiten für das Wärmemanagement und Elektro-/Elektronik-Testen—Brochure © 3M 2010; 8 pages.

Yamamoto et al, "Applying a Gas Mixture Containing c-C4F8 as an Insulation Medium", IEEE Transactions on Dielectrics and electrical Insulation, vol. 8 No. 6, Dec. 2001 (abstract only—2 pages.).

Cartwright, et al.; "Barrow Offshore Windfarm Design & Build of UKs First OWF Sub-Station"; Vestas KBR; Oct. 2005; 26 pages.

Kynast, et al.; "Basic investigations concerning equipment with liquefied SF6 under extreme low temperatures"; Technical Colloquium; 2011; 8 pages.

Anonymous: "CBWatch-2 Modular Circuit Breaker Monitoring System"; Alstom Product Brochure; Sep. 1, 2010; 4 pages.

Niemeyer, Lutz. "CIGRE Guide for SF6 gas mixtures. Application and Handling in electric power Equipment." ABB Corp Research Cetre; 2000; 8 pages.

Hillers, et al.; "Control, Monitoring and Diagnostics for High Voltage GIS"; IEE Colloquim on GIC (Gas-Insulated Switchgear); Nov. 14, 1995; pp. 6/1-6/4.

Milbrath; "Development of 3MTM NovecTM 612 Magnesium Protection Fluid as a Substitute for SF6 over Molten Magnesium"; Presented at the International Conference on SF6 and the Environment, Nov. 21-22, 2002.

Brand, "Dielectric Strength, Boiling Point and Toxicity of Gases—Different Aspects of the Same Basic Molecular Properties"; Oct. 1982; pp. 451-456.

3M(tm); "Fluorochemicals in Heat Transfer Applications"; Jun. 21, 2000; 27 pages.

Tuma, "Fluoroketone C2F5C(O)CF(CF3)2 as a Heat Transfer Fluid for Passive and Pumped 2-Phase Applications"; 24th IEEE Semi0Therm Symposium; 2008; 8 pages.

Christophorou, et al.; "Gases for electrical insulation and arc interruption : possible present and future alternatives to pure SF6"; NIST Technical Note 1425; Nov. 1997; 48 pages.

Smith, et al.; "Perfluoroisopropyl Ketones—The Chemistry of Carbonyl Fluoride. II. Synthesis of Perfluoroisopropyl Ketones"; Journal of the American Chemical Society (J. Am. Chem. Soc.), vol. 84, pp. 4285-4288, 1962.

(56) References Cited

OTHER PUBLICATIONS

Seimens Alarm Brochure—2005; 40 pages.

Abb, et al.; "Valhall Re-Development Project, Power From Shore"; Mar. 17, 2010; 5 pages.

3M Novec 1230 Fire Protection Fluid Article; Electronics Markets Materials Division; Issued Apr. 2009; Printed in USA. 8 pages.

3M Novec 649 Engineered Fluid; Electronics Markets Materials Division; Issued Sep. 2009. Printed in USA. 4 pages.

A Low-GWP Fluoroketone: Potential Alternative to SF6 in Some Dielectric Applications; NEMA Ad Hoc Task Group on SF6, Feb. 2009; Hyatt Regency, Phoenix; 8 pages.

P. Rivers; "Advancement in Sustainable Fire Suppression Development C6 F-Ketone—a novel new halon replacement alternative to HFCS and PFCS" Halon Options Technical working Conference; Apr. 2001; pp. 341-348.

E. Kynast, et al; "Basic investigations concerning equipment with liquefied SF6 under extreme low temperatures"; 2011 SC A3 Technical Colloquium. 1 page.

J. Owens, et al; "Experimentation Using Segregated Hydrofluoroethers and Fluorinated Ketones as Dielectric Vapors"; National Conference on SF6 and the Environment; San Diego, California; Nov. 2002; 8 pages.

R. Garzon; "High Voltage Circuit Breakers—Design and Applications"; Marcel Dekker, Inc; 1997; New York; pp. 139-141; 162-163; 170-177.

"International Conference on SF6 and the Environment—Emission Reduction Strategies: Final Attendee List" Wyndham San Diego at Emerald Plaza; Nov. 2002; 8 pages.

D. Gautschi, et al; "Ist SF6 in Hochspanningsschaltanlagen ersetzbar"; Branche Installations De Couplage; Bulletin Dec. 2014; pp. 43-46.

NEMA Ad Hoc Task Group on SF6;Hyatt Regency Phoenix; Oct. 2008; 2 pages.

Application No. PCT/EP2009/062640, International Filing Date: Sep. 29, 2009, Filing Date: Jun. 12, 2009, Date of Receipt at the International Bureau: Oct. 29, 2009, p. 36.

The Institute of Electrical Engineers in Japan; 2005. 2 pages.

ZX-Family—Gas-insulated medium voltage switchgear;ABB AG; 2009; 6 pages.

* cited by examiner

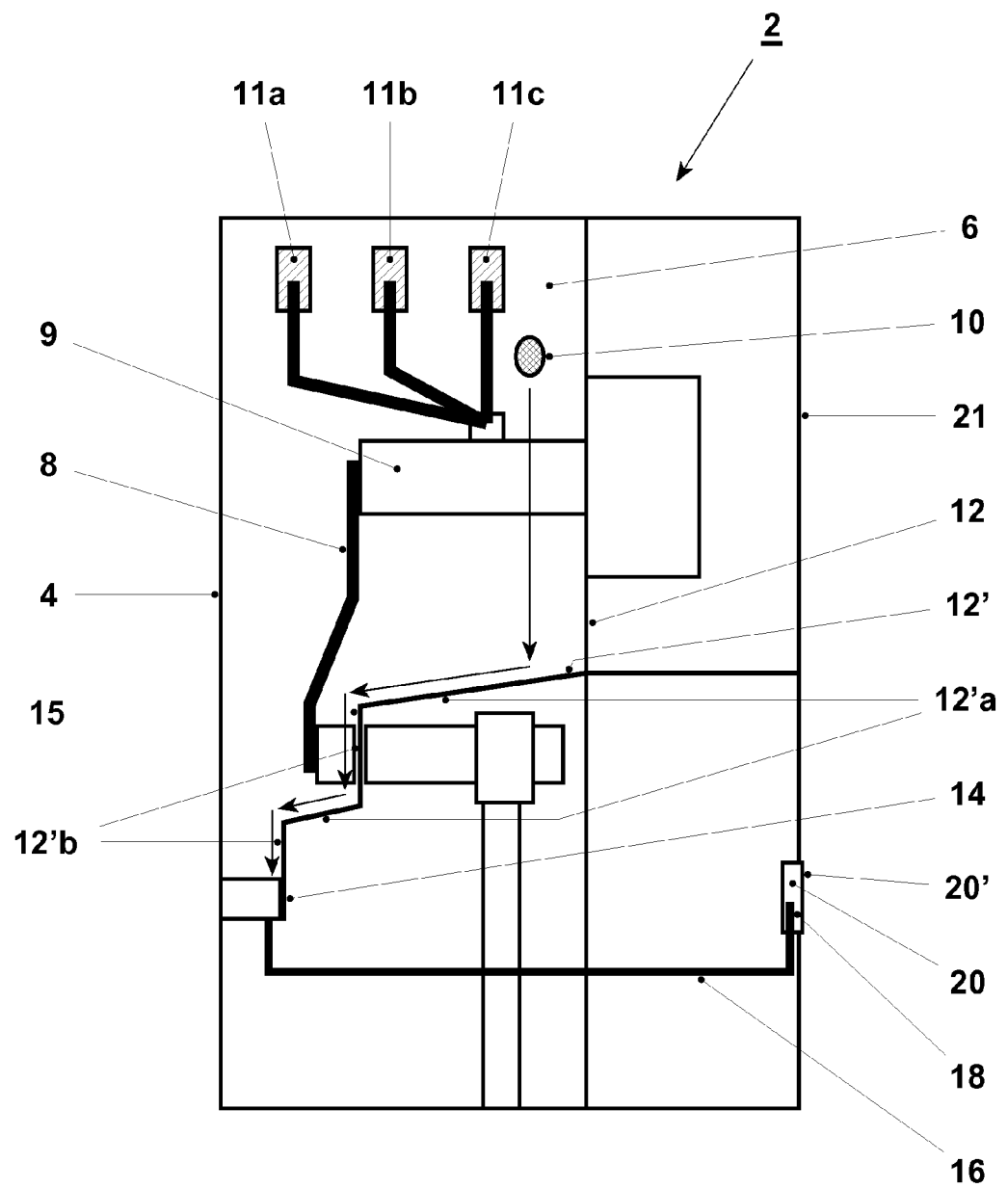

US 9,196,431 B2

ENCAPSULATED SWITCHGEAR

FIELD OF THE INVENTION

The present invention relates to an encapsulated switchgear, to a process for providing an encapsulated switchgear, and to the use of a dielectric compound having a boiling point of above −5° C. in an insulation medium for an encapsulated switchgear, in particular a medium voltage encapsulated switchgear.

BACKGROUND OF THE INVENTION

In medium or high voltage encapsulated switchgears, the electrical active part is arranged in a gas-tight housing, which defines an insulating space, said insulating space usually comprising an insulation gas and separating the housing from the electrical active part without letting electrical current to pass through. Thus, metal-encapsulated switchgears allow for a much more space-saving construction than switchgears which are insulated solely by ambient air.

For conventional encapsulated switchgears, insulation gases comprising a dielectric compound having a boiling point below −25° C. are used in order to prevent condensation over the complete operation temperature range. The required pressure of the insulation gas and/or the amount of the dielectric compound comprised in the insulation gas is governed by gas pressure measurement (with or without temperature compensation) or direct density measurement.

The equipment used for gas pressure measurement is in general relatively complex and expensive.

In addition, it is usually required that the insulation gas has a slight overpressure, which in medium voltage switchgears ranges typically from about 100 mbar to about 500 mbar, in order to allow for a precise pressure measurement in the insulating space of the switchgear. Due to this overpressure, the housing of the switchgear can be subject to mechanical stress and therefore be prone to gas leakage if appropriate technical measures are not taken.

However, the demands on the gas-tightness of the currently used switchgears are very strict, because conventional insulation gases with a high insulation and arc extinction performance have some environmental impact when released to the atmosphere and, in particular, have a relatively high global warming potential (GWP).

For this reason, the housing of the switchgear must be very robust even under the overpressure conditions mentioned above.

Also, for allowing repair work to be carried out in the inside of the housing, means are required for evacuating the housing prior to it being opened and reintroducing the insulation gas afterwards, before operation of the switchgear can be restarted.

The construction of the housing of a switchgear is thus relatively complex, which—in addition to the expensive gas pressure measurement equipment—further contributes to the relatively high cost of conventional switchgears.

With regard to the switchgear's potential impact on the environment and the corresponding constructive demands on the housing, efforts have been made in the past to replace the conventional insulation gases by suitable substitutes.

For example, WO 2008/073790 discloses a dielectric gaseous compound which—among other characteristics—has a boiling point in the range between about −20° C. to about −273° C., which is low-ozone-depleting, preferably non-ozone-depleting, and which has a GWP less than about 22,200. Specifically, WO 2008/073790 discloses a number of different compounds which do not fall within a generic chemical definition.

Further, EP-A-0670294 discloses the use of perfluoropropane as a dielectric gas and EP-A-1933432 refers to trifluor-oiodomethane ($CF_3I$) and its use as an insulating gas in a gas-insulated switchgear.

For improving the breakdown field strength compared to standard insulation media, U.S. Pat. No. 4,175,048 suggests a gaseous insulator comprising a compound selected from the group of perfluorocyclohexene and hexafluoroazomethane.

However, using the compounds according to the documents given above in an encapsulated switchgear requires sophisticated gas pressure measuring means, as pointed out above. Also, if high amounts of the insulation gas leak out of the housing, the reaction time for establishing sufficient insulating properties is often relatively long. In this case the panel has to be disconnected immediately to avoid damage of the switchgear.

SUMMARY OF THE INVENTION

The object of the present invention is thus to provide an encapsulated switchgear which can be operated in an environmentally friendly manner and which at the same time allows for a very simple and cost-effective design by meeting highest safety requirements.

The object is achieved by the subject matter of the independent claims. Preferred embodiments of the invention are defined in the dependent claims.

The term "encapsulated switchgear" according to the present invention includes an air-insulated or gas-insulated metal—(or otherwise)—encapsulated switchgear.

The term "electrical active part" used in the context of the present invention is to be interpreted broadly including a conductor, a conductor arrangement, a switch, a conductive component, and the like.

Due to the feature that the dielectric compound comprised in the insulation medium comprises a dielectric compound having a boiling point of above −25° C., the present invention allows a two-phase system to be established. Said system comprises at operational conditions an insulation gas comprising a gaseous part of the dielectric compound. This gaseous part is in equilibrium with a liquid part of the dielectric compound. Thereby, the liquid part functions as a reservoir of the dielectric compound which at a too low partial gas pressure enters the gas phase.

The present invention is based on the finding that by suitably choosing the dielectric compound, a concentration of the dielectric compound in the insulating gas of such a two-phase system can be achieved, which is sufficient for most applications of an encapsulated switchgear, and in particular for a medium voltage encapsulated switchgear.

In view of this, dielectric compounds having a relatively high vapour pressure are particularly preferred. Examples of such dielectric compounds will be described in detail below.

If insulation gas leaks out of the housing, the equilibrium between gas and liquid phase—and thus the required concentration of the dielectric compound in the insulation gas—is maintained or readily reestablished. Consequently, the required insulation performance is maintained even if the housing is leaking. Thus, no immediate interruption of the operation is necessary, which renders the switchgear very safe.

Given the fact that a sufficient concentration of the dielectric compound and thus sufficient insulation performance can be readily established as long as at least a part of the dielectric compound is in liquid phase, complex gas pressure measurement equipment can be avoided. In contrast, simply checking that a liquid part is present is sufficient for ensuring that the insulation gas comprises the dielectric compound in a sufficient concentration and thus has the required high insulation performance.

According to a preferred embodiment, the switchgear of the present invention comprises a receptacle determined for comprising at least a portion of the liquid part of the dielectric compound comprised in the housing. This allows checking of the required insulation performance by simply checking the level of liquid in the receptacle.

The receptacle is in general arranged in the insulating space.

In order to ensure that the presence of the liquid part comprised in the housing can be determined by checking the level of liquid in the receptacle, it is further preferred that the housing comprises collecting means for collecting at least a portion of the liquid part of the dielectric compound and transferring it to the receptacle. According to a particularly preferred embodiment, the inner surface of the housing's bottom wall is at least partly inclined, thus forming a spout leading into the receptacle. The receptacle is thus preferably arranged on the lowest point of the insulating space. During operation, the liquid collected on the bottom of the housing flows down the inclined inner surface of the housing's bottom wall and is received by the receptacle.

In addition, the switchgear preferably comprises an indicator for determining the amount of the liquid part of the dielectric compound in the insulating space, said indicator being arranged in a compartment, which is separated from the insulating space and connected with the receptacle by a channel. In general, the indicator is formed by the part of the channel, which extends into the separate compartment.

According to a further preferred embodiment, the housing comprises a transparent area allowing the receptacle and/or the indicator to be viewed from the outside. Thus, the determination of a sufficient insulation performance of the insulation gas can be carried out by simply looking through the transparent area and visually checking whether a liquid phase is present or not. The transparent area can for example be in the form of a watchglass, on which the minimum operation level of the liquid is indicated.

In the above mentioned embodiment, in which the indicator is formed by the part of the channel extending into the separate compartment, said part is generally transparent. As in this embodiment, the compartment comprising the indicator is in general placed according to the height of the insulation space, direct metering is possible, since under the same pressure the liquid in the compartment will have the same level as the liquid in the insulating space.

Theoretically, the dielectric compound and optionally the carrier gas can be introduced anywhere in the insulating space. In order to allow the dielectric compound to be introduced into the system during operation, respective means can be provided. For example, nozzles can be provided in the housing wall, through which an aerosol, in which small droplets of the liquid dielectric compound are dispersed in a carrier gas, can be introduced into the insulating space. Alternatively, the liquid dielectric compound can be introduced without a carrier gas through an inlet into the bottom part of the insulating space and preferably into the receptacle.

The present invention allows the use of a dielectric compound, which has excellent insulating properties, in particular a high breakdown field strength, and which at the same time is non-toxic and has no environmental impact when released to the atmosphere. This also allows for a simpler design of the switchgear for the reason that no means for evacuation and reintroduction of the insulation medium has to be provided. If repair work has to be carried out and the housing of the switchgear has thus to be opened, the insulation gas is simply released to the atmosphere. The liquid part of the dielectric compound, which is generally rather small, can be removed by means of a simple outlet, stored in a simple vessel and reintroduced by pouring it back to the insulation space after repair work is finished and before restarting operation of the switchgear.

According to a preferred embodiment, the dielectric compound is a fluoroketone having from 4 to 12 carbon atoms. Thereby, an insulation medium can be provided having high insulation capabilities and a very low GWP.

In general, the fluoroketone according to this embodiment has the general structure

R1-CO—R2 wherein R1 and R2 are at least partially fluorinated chains, said chains being independently from each other linear or branched and having from 1 to 10 carbon atoms. The definition encompasses both perfluorinated ketones as well as hydrofluorinated ketones. Generally, these fluoroketone have a boiling point of at least −5° C. at ambient pressure.

It has now been found that for many applications of the insulation gas, such as applications in the medium voltage range, a sufficient concentration or molar ratio, i.e. the ratio between the number of molecules of the fluoroketone to the number of molecules of the remaining components of the medium (generally the carrier or buffer gas), and thus also a sufficient breakdown field strength can be achieved even at very low operational temperatures e.g. of down to about −5° C. or even less, without additional measures such as external heating or vaporization.

Preferably, the fluoroketone has from 4 to 10 carbon atoms, more preferably from 4 to 8 carbon atoms, and most preferably 6 carbon atoms (also referred to as a C6-fluoroketone). As mentioned above, said C6-fluoroketone can be a perfluorinated ketone (having the molecular formula $C_6F_{12}O$) or a hydrofluorinated ketone.

Among the most preferred fluoroketones having 6 carbon atoms, dodecafluoro-2-methylpentan-3-one has been found to be particularly preferred.

Dodecafluoro-2-methylpentan-3-one (also named 1,1,1,2,2,4,5,5,5-nonafluoro-4-(trifluoromethyl)-3-pentanone, perfluoro-2-methyl-3-pentanone or $CF_3CF_2C(O)CF(CF_3)_2$) has previously only been considered useful for completely different applications, namely the processing of molten reactive metals (as referred to in WO 2004/090177), for the cleaning of a vapour reactor (as referred to in WO 02/086191) and in fire extinction systems, or in liquid form for cooling of electronic systems, or for the Rankine-process in small power plants (as referred to in EP-A-1764487).

Dodecafluoro-2-methylpentan-3-one is clear, colorless and almost odourless. Its structural formula is given in the following:

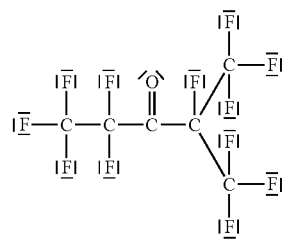

Dodecafluoro-2-methylpentan-3-one has an average lifetime in the atmosphere of about 5 days and its GWP is only about 1. In addition, its ozone depletion potential (ODP) is zero. Thus, the environmental load is much lower than the one of conventional insulation gases.

In addition, dodecafluoro-2-methylpentan-3-one is non-toxic and offers outstanding margins of human safety.

Dodecafluoro-2-methylpentan-3-one has a boiling point of 49.2° C. at 1 bar. Its vapour pressure, i.e. the pressure of the vapor in equilibrium with its non-vapor phases, is about 40 kPa at 25° C. Given the high vapour pressure of dodecafluoro-2-methylpentan-3-one, an insulation gas having a breakdown field strength sufficient for many applications, in particular in the medium voltage range, can in general also be achieved at very low temperatures down to e.g. −30° C.

According to a preferred embodiment of the present invention, the insulation gas is a gas mixture, which apart from the dielectric compound, and in particular the fluoroketone, further comprises a carrier (or buffer) gas. In a particularly preferred embodiment, the gas mixture comprises or is air, in particular dry air, or comprises or is at least one air component, in particular selected from the group consisting of carbon dioxide ($CO_2$), oxygen ($O_2$) and nitrogen ($N_2$). Alternatively, the insulation gas can substantially consist of the dielectric compound.

Based on the finding that at a temperature of 550° C. or higher, dodecafluoro-2-methylpentan-3-one is decomposed to very reactive fluorocarbon compounds having a lower number of carbon atoms, it is preferred that the insulating gas comprises sufficient oxygen ($O_2$) with which the fluorocarbon compounds formed can react to form inert compounds, such as e.g. $CO_2$.

The insulation properties of the insulation gas, and in particular its breakdown field strength, can be controlled by the temperature, pressure and/or composition of the insulation medium. By using the two-phase system comprising the dielectric compound, in particular the fluoroketone, both in liquid and gaseous phase, an increase of the temperature does not only result in an increase of the absolute pressure, but also in an increase of the dielectric compound's concentration in the insulation gas due to a higher vapour pressure.

According to a particularly preferred embodiment of the present invention, the molar ratio of the fluoroketone, in particular of dodecafluoro-2-methylpentan-3-one, in the insulation gas is at least 1%, preferably at least 2%, more preferably at least 5%, more preferably at least 10%, most preferably at least 15%. These preferred molar ratios refer to a given standard or prescribed operating condition. Under deviating conditions, the molar ratio may still vary from these preferred values.

The significance of an insulating medium comprising dodecafluoro-2-methylpentan-3-one in a molar ratio of at least 1%, or 2% respectively, is based on the finding that an insulation gas having this molar ratio can also be obtained at very low temperature conditions down to −30° C. for 2% and down to −40° C. for 1% and that this insulation gas has a sufficient dielectric strength for e.g. medium voltage gas-insulated switchgears, which are operated at an insulation gas pressure below 1.5 bar, in particular at around 1 bar.

Apart from the switchgear described above, the present invention further relates to a process, in which a dielectric compound is introduced into the insulating space of the switchgear, the amount of the dielectric compound introduced being such that at operational conditions the insulation medium comprises an insulation gas comprising a gaseous part of the dielectric compound, said gaseous part being in equilibrium with a liquid part of the dielectric compound.

Thus, a two-part system having the above mentioned advantages can be established in the insulating space of the switchgear.

According to a preferred embodiment of this process, the dielectric compound is introduced in liquid form, whereupon only a part of the dielectric compound evaporates in the insulating space. Thus, the two-part system can be established in a very simple and straightforward manner.

It is further preferred that the dielectric compound is introduced into the bottom part of the insulating space. This allows the filling level of the dielectric compound to be monitored immediately after introduction. Further, a homogenous distribution of the gaseous part in the insulating space can be readily established according to this embodiment.

The invention thus particularly relates to a medium voltage encapsulated switchgear. The term "medium voltage" as used herein refers to a voltage in the range of 1 kV to 72 kV. However, applications in the high voltage range (more than 72 kV) and in the low voltage range (below 1 kV) are feasible, as well.

Medium voltage encapsulated switchgears, for which the present invention is particularly well suited, are known to the skilled person. As examples, medium voltage switchgears of the ZX-family (ABB AG), of the GHA type (AREVA T&D), or of the type NXPLUS C (Siemens AG), are hereby cited.

BRIEF DESCRIPTION OF THE DRAWINGS

The present invention is further described in detail by way of the following examples in connection with FIG. 1, which shows schematically a medium voltage encapsulated switchgear according to the present invention.

DETAILED DESCRIPTION OF THE INVENTION

According to FIG. 1, the switchgear 2 comprises a housing 4 defining an insulating space 6 and an electrical active part 8 arranged in the insulating space 6. In the embodiment shown, the electrical active part 8 comprises a switch element 9 and three bus bars 11a, 11b, 11c connected to the switch element 9. The insulating space 6 comprises an insulation medium comprising an insulation gas. Said insulation gas comprises a gaseous part of a dielectric compound which is in equilibrium with a liquid part of the dielectric compound.

Droplets 10 of the liquid part condensed on the walls 12 of the housing 4 flow or fall downwards in direction to the bottom wall 12' (as indicated by an arrow). In the embodiment given in FIG. 1, the bottom wall 12' has a stepwise configuration, wherein segments 12' a inclined, in particular weakly inclined, downwards alternate with strongly inclined, in particular vertical, segments 12' b, and leads to a receptacle 14. Thus, the liquid collected on the bottom of the housing flows down the inner surface of the bottom wall 12' and is discharged into a receptacle 14. The inner surface of the bottom wall 12' thus functions as a collecting means 15 for collecting the liquid part of the dielectric medium.

From the receptacle 14, a channel 16, preferably in the form of a tube, leads to an indicator 18, which in the embodiment shown in the FIGURE is comprised in a compartment 20 arranged in the panel front 21 and is thus separate from the insulating space 6.

In the embodiment shown, the indicator 18 is formed by the part of the channel 16 extending into the compartment 20, said part being transparent. Also, the outer wall 20' of the compartment 20 is transparent, thus forming a watchglass.

As the compartment 20 comprising the indicator 18 is arranged corresponding to the height of the receptacle 14, direct metering of the filling level of the receptacle 14 is possible by watching through the outer wall 20' of the compartment 20.

Alternatively, the watchglass might also be formed by a transparent part of the housing itself. In this embodiment, the watchglass is arranged such that the receptacle in the insulating space can be viewed from the outside. As a special solution the watchglas itself can be the receptacle.

The invention claimed is:

1. An encapsulated switchgear comprising a housing defining an insulating space and an electrical active part arranged in the insulating space, said insulating space comprising an insulation medium, characterized in that the insulation medium comprises a dielectric compound having a boiling point of above −5° C., the insulation medium further comprising a carrier gas comprised of carbon dioxide and oxygen.

2. The encapsulated switchgear according to claim 1, characterized in that the dielectric compound is a fluoroketone having from 4 to 8 carbon atoms.

3. The encapsulated switchgear according to claim 1, characterized in that at operational conditions the insulation medium comprises an insulation gas comprising a gaseous part of the dielectric compound, said gaseous part being in equilibrium with a liquid part of the dielectric compound.

4. The encapsulated switchgear according to claim 2, characterized in that the fluoroketone 6 carbon atoms.

5. The encapsulated switchgear according to claim 4, characterized in that the fluoroketone is a perfluorinated ketone having the molecular formula $C_6F_{12}O$.

6. The encapsulated switchgear according to claim 5, characterized in that the fluoroketone is dodecafluoro-2-methyl-pentan-3-one.

7. The encapsulated switchgear according to claim 3, characterized in that it comprises a receptacle determined for comprising at least a portion of the liquid part of the dielectric compound comprised in the housing.

8. The encapsulated switchgear according to claim 7, characterized in that it further comprises collecting means for collecting at least a portion of the liquid part of the dielectric compound and transferring it to the receptacle.

9. The encapsulated switchgear according to claim 3, characterized in that it further comprises an indicator for determining the amount of the liquid part of the dielectric compound in the insulating space, said indicator being arranged in a space separate from the insulating space and being connected with the receptacle.

10. The encapsulated switchgear according to claim 7, the housing comprising a transparent area allowing the receptacle and/or the indicator, respectively, to be viewed from the outside.

11. The encapsulated switchgear according to claim 1, the switchgear being a metal-encapsulated switchgear.

12. The encapsulated switchgear according to claim 1, the switchgear being a medium voltage encapsulated switchgear.

13. A process for providing an encapsulated switchgear according to claim 3, by introducing a dielectric compound into the insulating space of the switchgear, wherein the amount of the dielectric compound introduced is such that at operational conditions the insulation medium comprises an insulation gas comprising a gaseous part of the dielectric compound, said gaseous part being in equilibrium with a liquid part of the dielectric compound.

14. The process according to claim 13, wherein the dielectric compound is introduced in liquid form, whereupon only a part of the dielectric compound evaporates into the insulating space.

15. The process according to claim 14, wherein the dielectric compound is introduced into the bottom part of the insulating space.

16. A method of providing an insulation medium for an encapsulated switchgear, comprising the step of utilizing a dielectric compound having a boiling point of above −5° C. in said insulation medium for the encapsulated switchgear, said insulation medium comprising at operational conditions an insulation gas comprising a gaseous part of the dielectric compound, said gaseous part being in equilibrium with a liquid part of the dielectric compound, the insulation medium further comprising a carrier gas comprised of carbon dioxide and oxygen.

\* \* \* \* \*